United States Patent
Sheaffer

[11] 3,965,011
[45] June 22, 1976

[54] ENDLESS FILTER BELT
[75] Inventor: John A. Sheaffer, Norwalk, Conn.
[73] Assignee: Dorr-Oliver Incorporated, Stamford, Conn.
[22] Filed: May 5, 1975
[21] Appl. No.: 575,031

[52] U.S. Cl. .................... 210/400; 210/DIG. 3
[51] Int. Cl.² ............................. B01D 33/14
[58] Field of Search .......... 210/400, 401, DIG. 1, 210/DIG. 3; 162/DIG. 1; 55/351, 354

[56] References Cited
UNITED STATES PATENTS

| | | | |
|---|---|---|---|
| 1,764,880 | 6/1930 | Nelson | 55/351 |
| 3,186,474 | 6/1965 | Levites | 55/351 |
| 3,615,023 | 10/1971 | Barnebl et al. | 210/401 |
| 3,642,142 | 2/1972 | Barnebl et al. | 210/401 |
| 3,840,122 | 10/1974 | Myers | 210/400 |

Primary Examiner—Theodore A. Granger
Attorney, Agent, or Firm—Burtsell J. Kearns; Theodore M. Jablon

[57] ABSTRACT

Endless filter belt for rotary vacuum drum filters, featuring a novel improved belt connection whereby the transverse terminal end portions of a length of filter belt are separably joined together by the use of a novel combination of press type closure pile fabrics or materials, capable of absorbing any longitudinal tension stresses in the filter belt, while readily deformable from the initial transverse linear extent.

13 Claims, 17 Drawing Figures

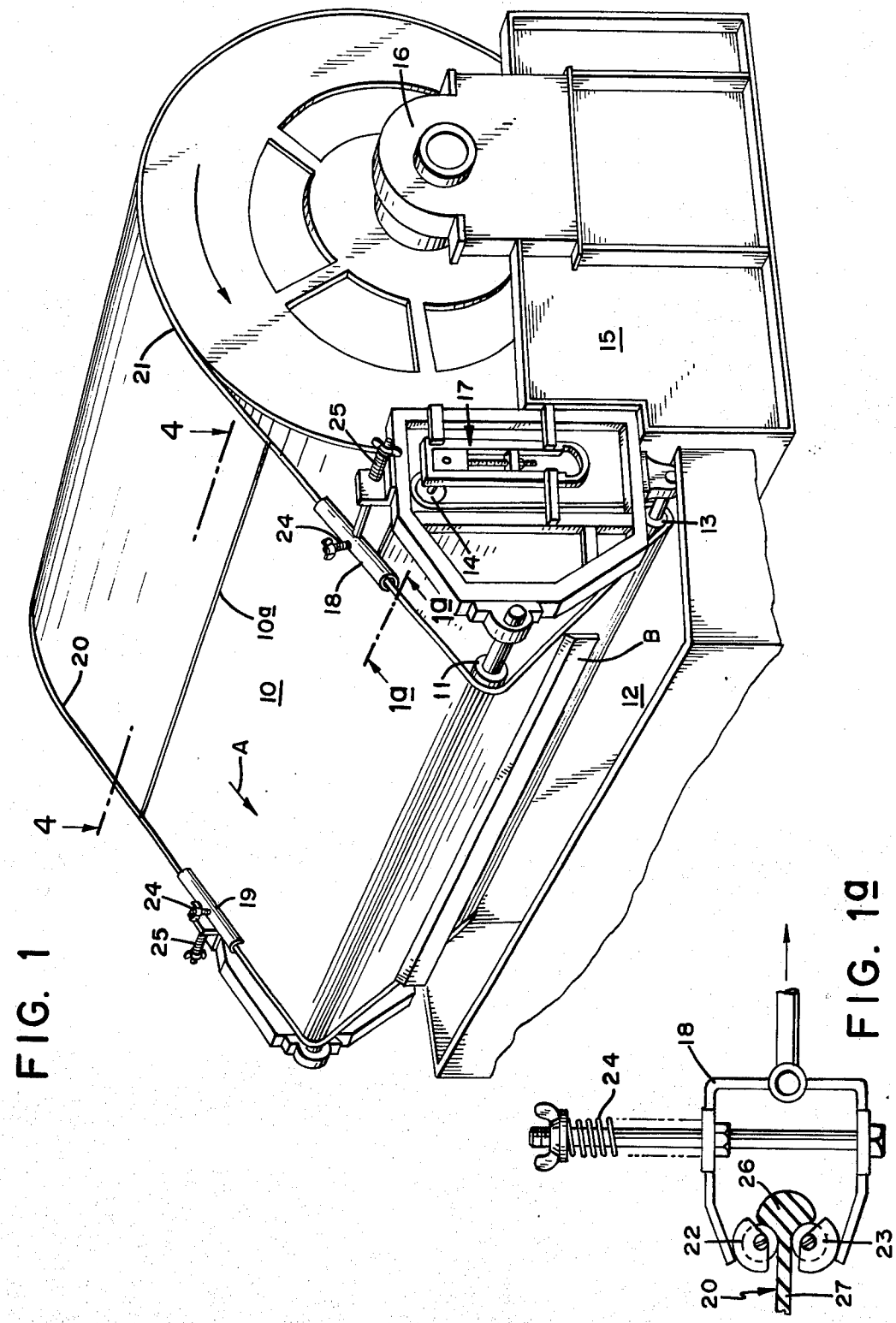

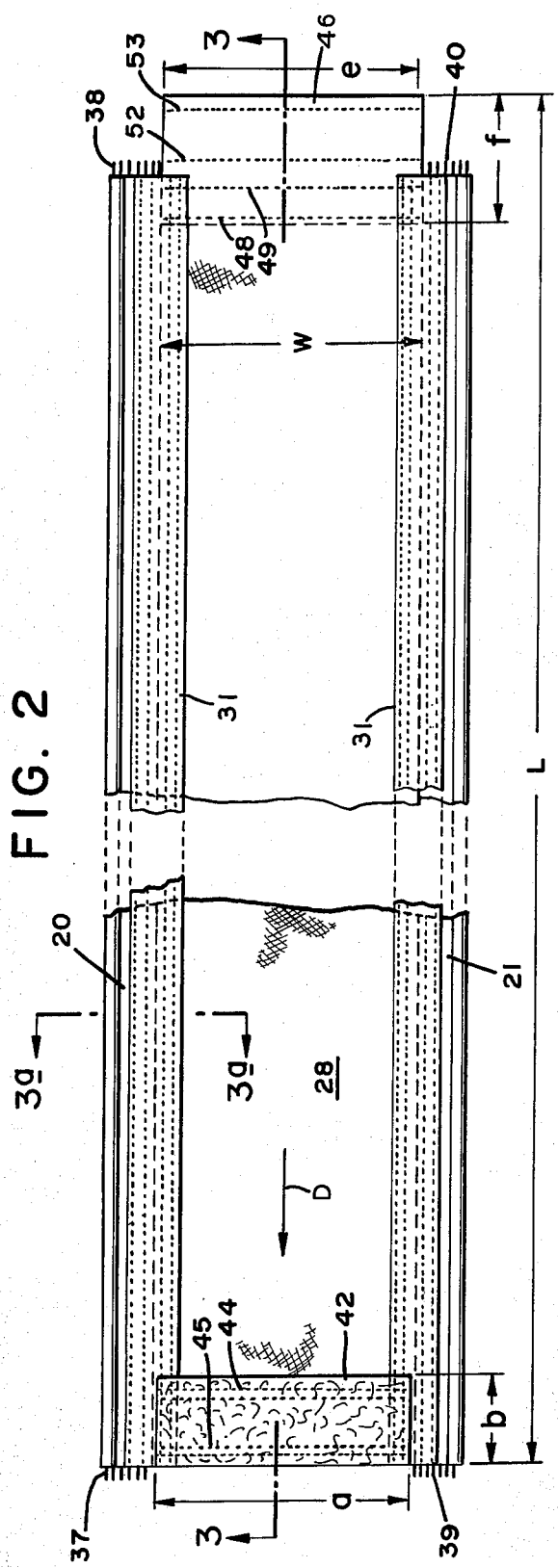
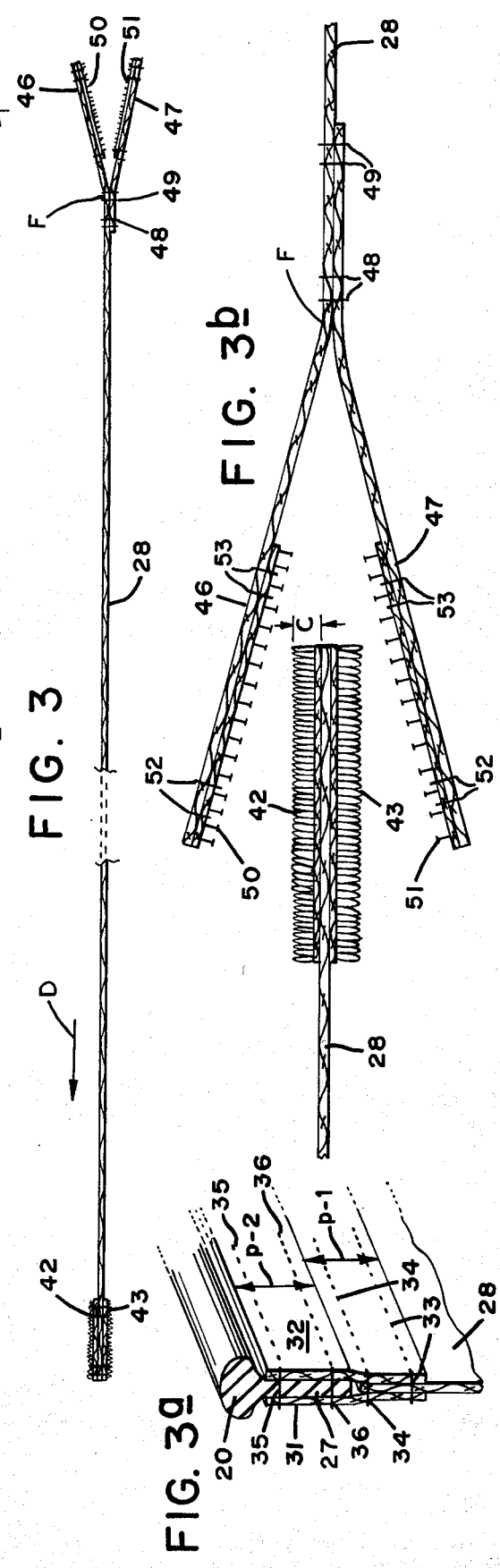

ENDLESS FILTER BELT

This invention relates to rotary vacuum drum filters of the type that is equipped with an endless travelling filter belt.

In this travelling belt type filter unit, a horizontal drum is mounted on a support structure with drive means for rotating the drum through a filtration cycle, with the lower portion of the drum immersed in a bath of slurry. An endless travelling filter belt of porous filter material surrounds and engages a major portion of the circumference of the drum so that the belt is moved by the rotation of the drum, the filter being effective to collect and hold a layer or cake of slurry solids from the bath to be discharged from the filter belt in the course of the filtration cycle. Auxiliary roller devices are provided for guiding the filter belt away from the upper portion of the drum to effect discharge of the cake material from the belt and then back onto the lower portion of the drum where the layer of solids is collected from the bath.

More in particular, the invention is concerned with improvements in the separable connection that unites the transverse terminal edges of the open length of the filter belt.

It is among the objects to avoid certain drawbacks encountered in the operation as well as manipulation of filter belt connectors heretofore in use, by the provision of an improved connection that is much more readily maintainable intact and adaptable to peculiarities in the operation of such a filter belt, minimizes the time and man power required for installing and for dismounting the filter belt so that the belt connection can be rapidly and conveniently closed as well as opened whenever it becomes necessary to replace a worn or clogged filter belt, and which connection is capable of transmitting any longitudinal tension imposed upon the filter belt by the rotation of the motor driven filter drum.

The present invention provides an improved filter belt connection which for example, may replace the one of the type disclosed in U.S. Pat. to Barnebl No. 3,503,517. This earlier filter belt connector comprises a row of closely spaced wire loops provided along each of the terminal mating edges of the filter belt. With the two rows of wire loops pointing towards each other in mutually staggered and mutually overlapping relationship, a locking wire then had to be threaded through the overlapping portions of the two rows of loops securing them together, so as to constitute a hinge across the entire width of the filter belt. This wire threading operation is tedious and time consuming, especially if one visualizes a filter drum of 10 to 12 feet in diameter, and of 16 to 18 feet in length which in turn represents the width of the filter belt through which the locking wire must be threaded. Withdrawing the locking wire when replacing the filter belt, is also tedious and time consuming.

Another drawback is due to breakage of the locking wire with resultant problems presently to be explained.

Accordingly, at the outset of the operation of a newly installed filter belt, the belt connection including the locking wire appears as a transverse seam extending across the width of the belt. But in the course of continued filter operation, a peculiarity develops in that this filter belt connection fails to maintain its initial substantially straight linear shape, but tends to assume variously shaped wavy or otherwise shaped curvatures, as may result from uneven longitudinal stretching over the width of the filter cloth. Such recurring bending deformations may result in breakage of the wire at various points along its length, accompanied by axial slippage of the wire, and consequent disconnection from each other of a corresponding number of the thus freed wire loops. Wire portions or wire loops may thus get caught on a cake discharge scraper or other parts of the machine.

Furthermore, in order to prevent lateral deviation or so-called wandering of the filter belt on the drum, belt tracking means may be provided, such as those shown in the aforementioned U.S. Pat. No. 3,503,517, whereby transverse stretch is applied to the filter belt by a pair of stationary tracking devices located at the cake delivery side of the filter drum. Engaging the bead shaped lateral edge portions of the filter belt, these tracking devices not only maintain proper alignment of the belt relative to the drum, but also tend to smooth out longitudinal wrinkles in the filter cloth.

In the example of U.S. Pat. No. 3,503,517, the lateral beaded edge portions of the filter belt are provided by a pair of guide strips or strip elements of flexible material edgewise connected to the respective longitudinal edges of a strand of the filter media or filter cloth. This strip element may be of rubber or suitable composition material, comprising a flange portion co-planar with the filter media and secured thereto along the length thereof, and an enlarged portion providing a bead along the length of the filter belt. The beads are gripped by the respective stationary tracking devices.

The mutually opposed transverse pull or transverse stretching effect of these tracking devices, acting in opposite directions relative to one another, corrects lateral wandering of the filter belt while also tending to smooth out longitudinal wrinkles in the filter cloth.

To attain the foregoing objectives of improvement, the invention provides a novel structural combination of press closure type pile fabrics or materials, whereby all of the aforementioned drawbacks are eliminated.

Accordingly, a strip of one type of pile fabric is firmly attached or secured to each side of one transverse terminal end portion of the strand of filter media or filter cloth of the open or developed length of the filter belt. With its backside contiguous to the filter cloth, the outwardly facing pile fiber material on either side of the filter cloth may occupy the transverse distance between the aforementioned beaded flexible track elements or strips. The thus prepared end portion of the strand of filter media constitutes what may be termed the prepared straight end portion of the developed length of the filter belt.

Connected to the opposite transverse terminal end portion of the filter cloth is a pair of flaps which may consist of filter cloth material. Firmly attached or sewn to the inner face of each of these flaps is a strip of inwardly facing pile fabric or material, complementary to the outwardly facing pile fabric on either side of the opposite straight end portion of the filter cloth.

Accordingly, when the prepared straight end portion of the filter cloth is received and properly positioned between the flaps, of the opposite end portion, it is only necessary to press the flaps together so that the inwardly facing piles of the flaps will lock with the respective outwardly facing piles of the enclosed straight end portion of the filter cloth, thereby establishing a shearing stress transmitting connection between the two ends of the filter cloth.

Then again, if the filter belt is to be dismounted as for belt replacement, the two flaps may be pulled or forced apart, thereby releasing the enclosed or mating straight end portion from their grip.

The invention further provides for a novel combination of two different kinds of belt closure devices, namely the one connecting the terminal ends of the filter cloth through a novel pile fabric combination, and a separable hinge connection between the respective mutually adjoining ends of the beaded rubber strips of the belt tracking means.

Specific features of the invention are concerned with details of construction of the improved filter belt, and details of the pile fabric combination.

Other features and advantages will hereinafter appear.

FIG. 1 is a perspective view of an example of a vacuum drum filter equipped with endless travelling filter belt, showing the location of the belt connection, as well as filter belt tracking devices engaging the longitudinal edge portions of the filter belt.

FIG. 1a is a greatly enlarged transverse sectional view of one of the belt centering devices, taken on line 1a — 1a of FIG. 1.

FIG. 2 is a plan view of the developed length of the filter belt per se, showing at the ends thereof the respective mutually complementary sections of the filter belt connection comprising interengagable pile fiber materials.

FIG. 3 is a longitudinal sectional view of the filter belt taken on line 3—3 of FIG. 2, having a straight end with pile fiber material applied to either side thereof and a complementary pair of correspondingly prepared flaps provided at the opposite end.

FIG. 3a taken on line 3a — 3a of FIG. 2 is a cross-sectional view of one beaded edge portion of the tracking means of the filter belt.

FIG. 3b shows the prepared ends of the filter belt of FIG. 3, in preliminary pile fiber closing position relative to one another.

Figure 4:
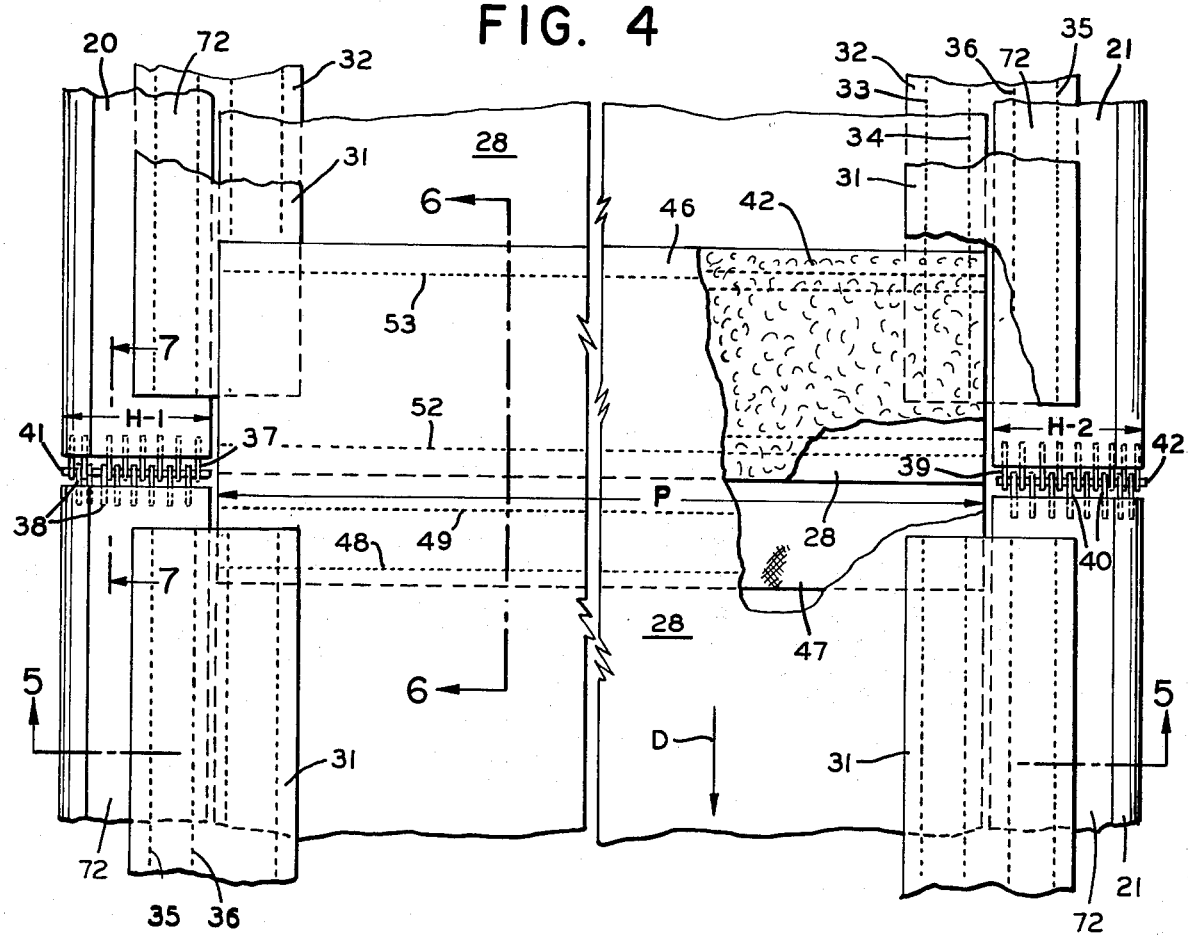

FIG. 4 taken on line 4—4 in FIG. 1, is a greatly enlarged plan view of the filter belt connection, showing the combination of two different kinds of belt connecting means.

Figure 5:
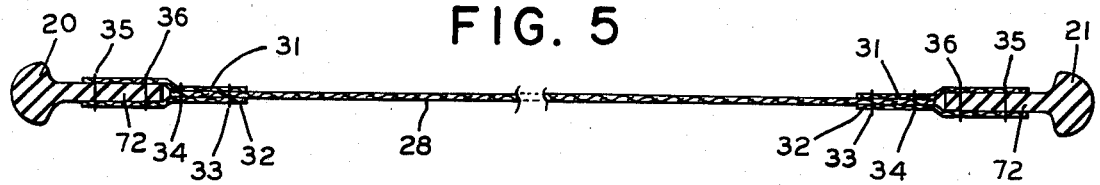

FIG. 5 is a cross-sectional view of the filter belt, taken on line 5—5 in FIG. 4, showing the beaded profile of guide strips connected to the longitudinal edges of the filter cloth for tracking the same.

Figure 6:
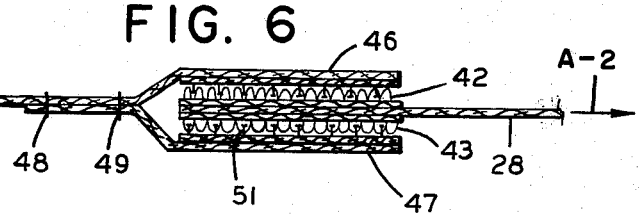

FIG. 6 is a cross-sectional view taken on line 6—6 in FIG. 4 of the belt connection, similar to FIG. 3b, although with the parts in press closed condition.

Figure 7:
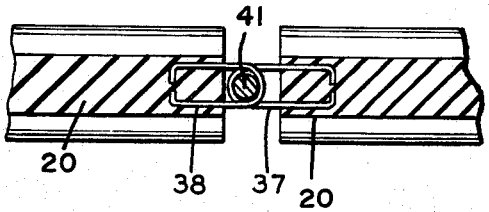

FIG. 7 is a cross-sectional detail view of the belt connection, taken on line 7—7 in FIG. 4, showing a separable hinge connections for the beaded flexible tracking strips.

Figure 8:
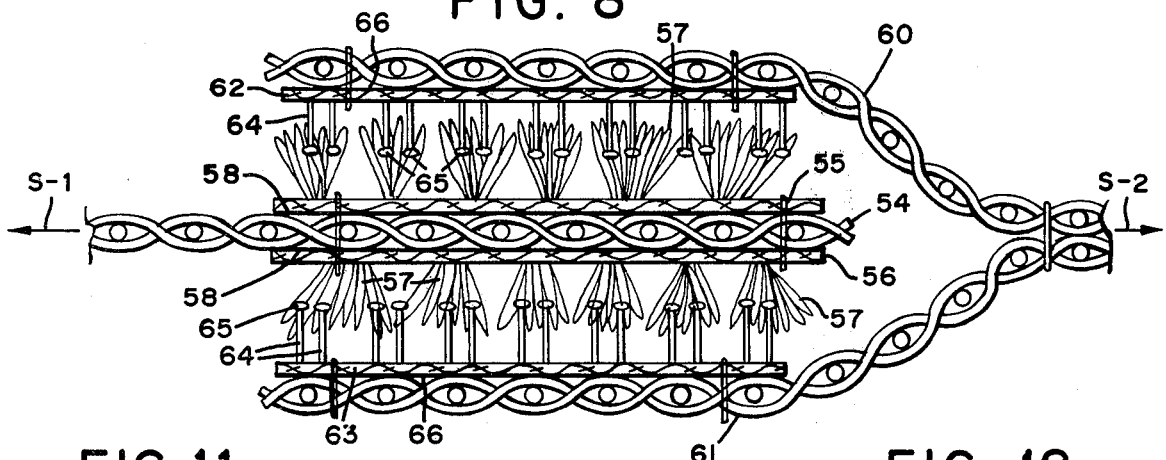

FIG. 8 is a greatly enlarged detail cross-sectional view of FIG. 6, showing one form of the pile fiber closure.

Figure 9:
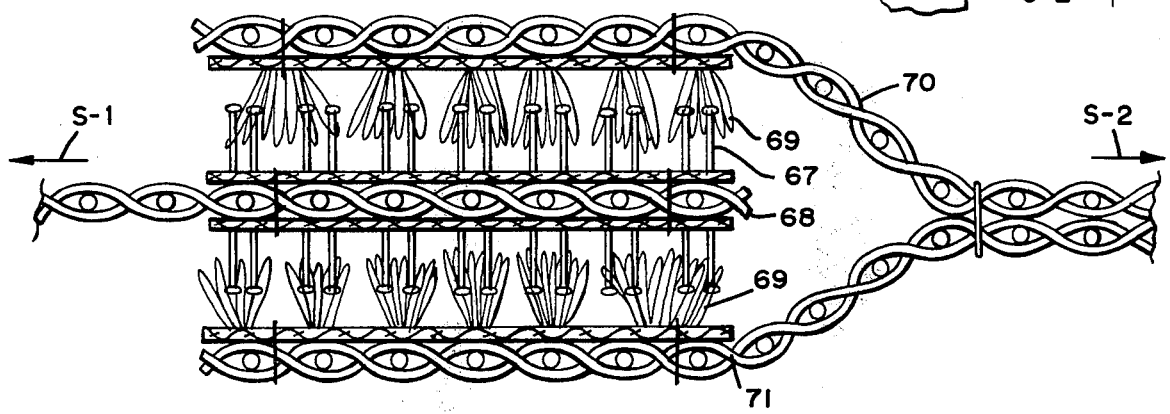
Figure 10:
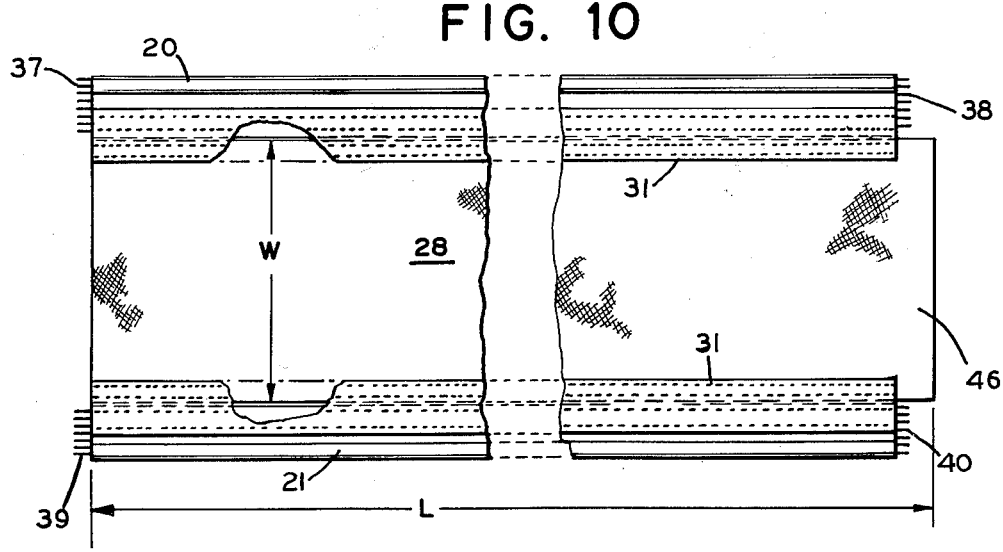

FIG. 9 is a view similar to FIG. 10, showing another form of the pile fiber closure.

FIG. 10 is a plan view of the developed length of the filter belt stripped, prior to the application of the pile fiber closure materials.

Figure 11:
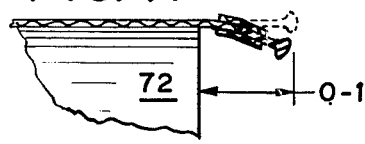

FIG. 11 is a fragmentary detail view of a corner portion of the filter drum, showing an average lateral overhang of the filter belt (not shown as such in FIG. 1).

Figure 12:
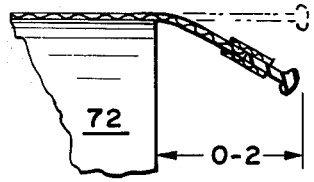
Figure 13:
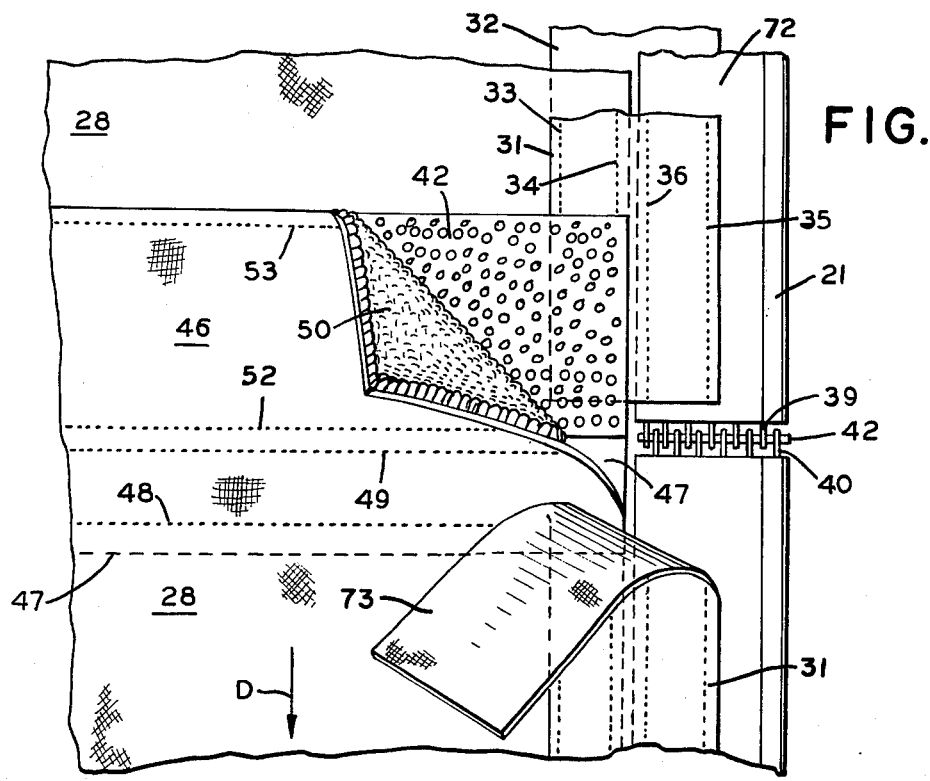

FIG. 12 is a view similar to FIG. 13, showing the occurrence of a greater or maximum overhang of the filter belt, due for correction by the belt tracking means.

Figure 14:
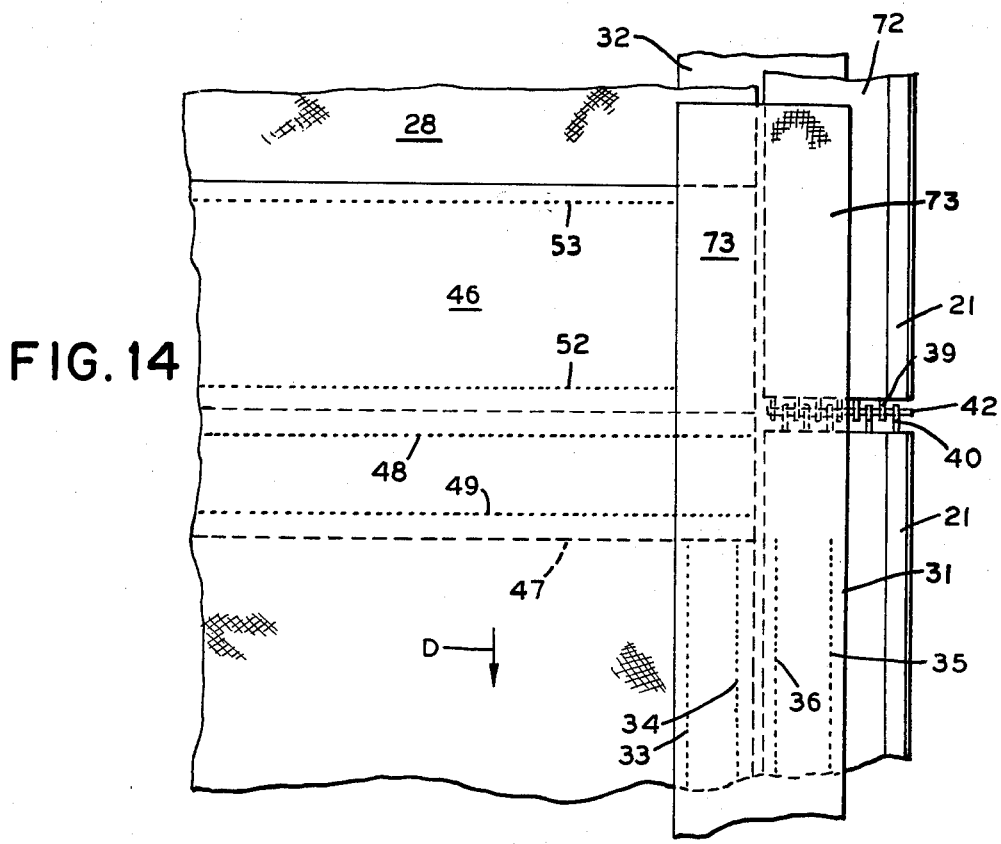

FIG. 13 is a view similar to FIG. 14, showing the cover flap rolled back, exposing the hinge connection.

FIG. 14 is a plan view of the right hand half of the filter belt connection of FIG. 4, with the addition of a longitudinally extending cover flap to overlie the hinge connection.

A belt type rotary vacuum drum filter embodying the invention, is shown in the perspective view of FIG. 1, including preferred belt tracking means of the kind disclosed in U.S. Pat. to Barnebl et al. No. 3,503,517.

In this example of the machine, an endless filter belt 10, having belt connector means indicated at 10a, is moved by the rotation of the filter drum in the direction of arrow "A" by means of drive mechanism (not shown). From the top of the drum the filter belt moves over a cake discharge roller 11 for delivering filter cake material into a receiver 12. From the discharge roller the filter belt continues down over a lower guide roller 13, then up and over an upper guide roller 14, then down again and around the lower portion of the filter drum. Filter cake then forms on the filter belt while passing through a bath of pulp contained in a tank or vat 15 which supports the filter drum as in a pair of trunnion bearings 16. Filter cake forms on the submerged portion of the filter belt on the lower portion of the drum, during the vacuum phase of the filtration cycle which controls the operation of the filter drum. The filter cake thus formed and held on the filter belt is carried to emergence and over the top of the drum to discharge over roller 11.

Conventional adjusting means 17 are shown for effecting up - or down adjustment of the upper guide roller 14 for adjusting tension or slack respectively of the filter belt.

A conventional horizontal scraper blade "B" may be provided at a location below the discharge roller 11 for effecting the removal into the receiver of filter cake material that may be adhering to the filter belt.

In its preferred form, the belt tracking means comprise a pair of stationary tracking devices 18 and 19 (see also FIG. 1a) cooperating with a pair of tracking strips 20 and 21 constituting the longitudinal or lateral edge portions of the filter belt. Each of the two tracking devices 18, 19 comprises an assembly of parallel glide shoes 22 and 23 of substantial length, and urged towards each other by spring pressure 24. While slidably engaging a bead portion of a respective tracking strip, this glide shoe assembly in turn is urged by spring pressure 25 in a lateral direction and transversely away from the associated edge of the filter belt. Accordingly, the tracking strips each have a longitudinally extending bead portion 26 unitary with a flange portion 27 which is coplanar with the plane of the filter cloth of the filter belt. The flange portion 27 is connected as by sewing to the associated longitudinal edge portion of the filter cloth in a manner furthermore to be described.

The improved belt connector means of this invention, indicated at 10a in FIG. 1, will now be described in detail by reference to FIGS. 2 to 14.

The novel belt connection when closed is shown in the plan view of FIG. 4 along with detail sectional views of FIGS. 5, 6, and 7. Thus it may be seen that the connection comprises in combination a pair of separable hinge connections H-1 and H-2 for the respective tracking strips 20 and 21, and between them a pile fiber connection "P" separably uniting the mutually adjoining end portions of the filter cloth, all of which is to be furthermore described.

The open or developed length of the filter belt as illustrated mainly in FIGS. 2, 3, 3a, and 10, comprises as the basic element a strand of filter media or filter cloth 28 also identified by length "L" and width "W".

Each of the above described tracking strips 20 and 21 is connected to a respective lateral edge portion of the filter cloth, extending along the length thereof. As shown in FIG. 3a, the tracking strips are connected as by sewing to a pair of fastening strips 31 and 32 consisting of filter cloth material. These fastening strips have an inner portion p-1 fixed to the filter cloth between them as by means of rows of stitching 33 and 34. Outer portions p-2 of these fastening strips are connected to the flange portion 27 of the tracking strip between them, as by means of rows of stitching 35 and 36.

Projecting from the end faces of the one tracking strip 20 are respective sets or short rows of embedded wire loops 37 and 38. Similarly, two sets or short rows of wire loops 39 and 40 project from the ends of the other tracking strip 21. Respective sets of wire loops may be interconnected by means of locking pins 41 and 42 respectively, thus constituting the aforementioned hinge connections H-1 and H-2 (see FIGS. 4 and 7).

FIG. 10 shows the open or developed filter belt so far described with the remainder furthermore described as follows.

Accordingly, (see FIGS. 2 and 3b), pile fiber fabrics or materials 42 and 43 also identified by dimensions a and b as well as by the thickness c, are fastened back-to-back to each other, as well as to the left hand end portion of the filter cloth between them. These parts or materials being sewn togehter as indicated by rows of stitching 44 and 45, constitute what is herein termed the prepared straight end portion of the filter cloth.

The opposite or right end of the filter cloth in FIGS. 2 and 3b has a pair of flaps 46 and 47 consisting of filter cloth material. FIG. 3 shows that one flap 46 is an extension of the filter cloth itself, presenting an uninterrupted or smooth outer surface "F." The other flap 47 designated by dimensions a and b is fastened to the filter cloth as indicated by stitches 48 and 49. The provision of the smooth surface F avoids interference with the scraper blade B when the filter belt of the invention installed on the machine, moves in the direction indicated by arrow D.

Pile fabrics 50 and 51 (see FIG. 3b) are connected as by sewing to the inner faces of the respective flaps, such being indicated by rows of stitching 52 and 53.

Preparatory to establishing the belt closure illustrated in FIG. 4 of the filter belt, the prepared end portions thereof are aligned against each other. Thus the ends of respective tracking strips 20 and 21 will register with each other, with the aforementioned sets of cooperating wire loops in position and ready for the insertion of the locking pins 41 and 42 to establish the hinge connections H-1 and H-2 shown in FIGS. 4 and 7.

Such preparatory positioning or alignment of the ends of the filter belt interposes the aforementioned prepared straight end portion of the filter cloth between the prepared flaps. After the insertion of the locking pins for the hinge connections, it is only necessary to press the flaps together in order to establish the separable pile fiber interengagement and connection (see FIG. 6) of the flaps with the complementary pile fibers of the thus enclosed prepared straight end portion of the filter cloth.

The thus completed pile fiber connection while resistant against the stress of longitudinal shear, is readily separable, and together with the separable hinge connection is more than adequate to absorb the pull of any longitudinal stresses in the filter belt during operation, as indicated by arrows A-2 (see FIG. 6).

Furthermore, during operation, the present filter belt connection, because of its general flexibility, will adjust its shape or curvature to any uneven longitudinal stretching in the area of the filter cloth.

In a practical embodiment, the invention may avail itself advantageously of kinds of pile fiber materials as disclosed in U.S. Pat. to Naimer No. 3,138,841, and made under the name of "Scotch Mate" by the Minnesota Mining & Manufacturing Company, St. Paul, Minn.

The greatly enlarged diagrammatic cross-sectional views of FIGS. 10 and 11 illustrate the manner in which these pile fiber materials may be utilized in the construction of the filter belt connection of this invention.

The known press type fastening device of said Naimer comprises only a first and a second pile fiber fabric interengaged in face-to-face relationship. This interengagement is due to the provision on the first fabric of a multiplicity of flexible woven loops preferably consisting of Nylon thread. The second fabric has piling of upstanding mono-filaments formed with slightly enlarged or mushroomlike top ends or heads interengaging with, or snared by the loops, when the two fabrics are pressed together. However, this interengagement can be broken if the two pile fiber fabrics are forcibly pulled apart.

When utilizing these two kinds of pile fiber fabrics in the filter belt closure construction of this invention, the FIG. 8 embodiment thereof presents itself as follows:

To both sides of the straight end portion 54 of the filter cloth there are fixed or sewn pile fabrics 55 and 56 respectively, having pile fibers in the form of loops 57 consisting preferably of nylon thread. A plastic coating 58 is shown to cover the back side of this pile fabric material.

The opposite prepared end portion 59 of the filter cloth has flaps 60 and 61 consisting of filter cloth material. The inner faces of these flaps have sewn to them pile fabric 62 and 63 respectively of the kind that has piling in the form of upstanding mono-filaments 64 formed with round heads 65. A plastic coating 66 may cover the backside of this fabric.

When the flaps 60 to 61 are pressed togehter and thus against both sides of the interposed prepared straight end portion 54, the heads 65 of mono-filaments 62 and 63 will interlock with, or be snared by the loops 57. The thus completed pile fiber connection is amply capable of absorbing any longitudinal stresses or pull in the filter belt. However, in order to open the closure, the two flaps with the mono-filaments can be pulled or forced apart, and out of engagement with the fiber loops.

The FIG. 9 embodiment of the pile fiber closure functions in the same manner as the embodiment of FIG. 8, even through the position of the two kinds of pile fiber material is shown reversed. Accordingly, the prepared end portion 68 of the filter cloth presents mono-filaments 67, while flaps 70 and 71 of the opposite end of the filter cloth present pile fiber loops 69.

FIGS. 11 and 12 illustrate the fact that the width of the filter belt is greater than the width of the filter drum, in order that the overhanging beaded guide strip of the lateral edge portions of the filter belt may cooperate properly with the respective tracking devices 18 and 19 of FIG. 1. The alternating bending and straightening of the overhanging edge portions as the filter belt moves from the filter drum through the tracking devices, is rendered harmless due to the flexible nature of the present belt closure construction.

Illustrating that condition, FIG. 11 shows a fragmentary detail view of a corner portion 72 of the filter drum, presenting an average lateral overhang O-1 of the filter belt. Also indicated in dot-and-dash is the alternating bending and straightening of the overhang.

FIG. 12 while similar to FIG. 11, presents the condition where a greater or maximum overhange O-2 has occurred because of deviation of the filter belt, and due for correction by the tracking devices.

FIG. 14 is a view of the filter belt closure construction of the invention similar to the one of FIG. 4, except for the addition of a longitudinal cover flap at the separable hinge connections. For this purpose, the trailing end of fastening strips 31 is provided with an extension 73 overlying the hinge connection. FIG. 13 shows this cover flap rolled back, exposing the hinge connection.

I claim:

1. Endless filter belt for a rotary vacuum drum filter which comprises a strand of filter media having longitudinal edge portions and transverse end portions, a first pair of pile fiber fabrics fastened to respective faces of one end portion of said strand, in back-to-back relationship, and thus constituting with said filter media a prepared straight end portion of said stand, a pair of flaps provided on the opposite end portion of said strand of filter media, a second pair of pile fiber fabrics fastened to respective inner faces of respective flaps, and in face-to-face relationship, adapted to receive between them said prepared straight end portion of said strand, and to separably interlock with the pile fibers of said straight end portions, for transmitting shearing stresses resulting from the longitudinal pull of the filter belt.

2. The filter belt according to claim 1, wherein one of said pairs of pile fiber fabrics has pile fibers in the form of loops, and wherein the other pair of pile fiber fabrics has upstanding pile fibers in the form of monofilaments having heads adapted to be separably ensnared by said loops.

3. The filter belt according to claim 1, wherein said two pairs of pile fiber fabrics are fastened to said one end portion of the strand and to said flaps respectively by means of sewing.

4. The filter belt according to claim 1, wherein one of said pairs of pile fiber fabrics has pile fibers in the form of loops of plastic thread, and wherein the other pair of pile fiber fabrics has upstanding fibers in the form of mono-filaments of thermoplastic material having thermoplastically formed heads adapted to be separably ensnared by said loops.

5. The filter belt according to claim 1, wherein one of said flaps is formed by an extension of said strand of filter media, and arranged to face outwardly when the filter belt is installed on said drum.

6. Endless filter belt for a rotary vacuum drum filter, which comprises a strand of filter media having longitudinal edge portions and transverse end portions, a beaded guide strip of flexible material fastened to each of said longitudinal edge portions along the length thereof, a separable connection between the ends of each said guide strip, a first pair of pile fiber fabrics fastened to respective faces of one end portion of said strand of filter media, in back-to-back relationship and thus constituting with said filter media a prepared straight end portion of said strand.

a pair of flaps provided on the opposite end portion of said strand of filter media, a second pair of pile fiber fabrics fastened to respective inner faces of respective flaps, and in face-to-face relationship, adapted to receive between them said prepared straight end portion of said strand, and to separably interlock with the pile fibers of said straight end portion, for transmitting stresses resulting from the longitudinal pull of the filter belt.

7. The filter belt according to claim 6, wherein said separable connection for the guide strips is a hinge connection.

8. The filter belt according to claim 6, wherein said separable connection for guide strips is a hinge connection which comprises a row of parallel wire loops projecting from each end face of the guide strips, and locking pins cooperating with respective wire loops to constitute the hinge connections.

9. The filter belt according to claim 6, wherein one of said pairs of pile fiber fabrics has pile fibers in the form of loops, ad wherein the other pair of pile fiber fabrics has upstanding pile fibers in the form of mono-filaments having heads adapted to be separably ensnared by said loops.

10. The filter belt according to claim 1, wherein said two two pairs of pile fiber fabrics are fastened to said one end portion of said strand and to said flaps respectively by sewing.

11. The filter belt according to claim 1, wherein one of said flaps is formed by an extension of said strand of filter media, and arranged to face outwardly when the filter belt is installed on said drum.

12. The filter belt according to claim 1, wherein said hinge connections comprise a row of parallel wire loops projecting from each end face of each of said guide strips, and adapted to be placed in cooperative relationship when the ends of the filter belt are positioned to register with one another, and a locking pin for each hinge connection, adapted to be inserted through each pair of cooperating rows of wire loops.

13. The filter belt according to claim 1, wherein said flexible guide strips comprise a beaded outer guide portion and a flange portion extending inwardly from said beaded guide portion and in the plane of said strand of filter media, a pair of opposedly arranged fastening strips connecting each said flange portion with the respective adjoining edge portion of said strand of filter media, and wherein said pairs of pile fiber fabrics extend across the width of said strand of filter media and between the inner longitudinal edges of said flange portions of the guide strips.

* * * * *